United States Patent [19]

Milovac

[11] 4,056,518
[45] Nov. 1, 1977

[54] RATCHET HEAD TAPE MOVER

[76] Inventor: Sidney Milovac, 4215 W. 45th St., Chicago, Ill. 60632

[21] Appl. No.: 598,503

[22] Filed: July 22, 1975

Related U.S. Application Data

[63] Continuation-in-part of Ser. No. 372,871, June 22, 1973, abandoned.

[51] Int. Cl.² ............................................. G11B 21/12
[52] U.S. Cl. ..................................... 360/106; 360/109
[58] Field of Search ................................ 360/106, 109

[56] References Cited

U.S. PATENT DOCUMENTS

| | | | |
|---|---|---|---|
| 2,678,971 | 5/1954 | Barany | 360/109 |
| 2,880,280 | 3/1959 | Gernert et al. | 360/109 |
| 3,450,409 | 6/1969 | Pitzer | 360/106 |
| 3,538,779 | 11/1970 | Yamamoto | 360/106 |
| 3,820,160 | 6/1974 | Huber | 360/106 |

*Primary Examiner*—Stuart N. Hecker
*Attorney, Agent, or Firm*—Kirkland & Ellis

[57] ABSTRACT

A molded plastic unit in the form of a frame surrounds a rotatably mounted ratchet wheel. Oppositely directed ratched engaging arms extend from inner walls of the frame each at an angle approximately equal to the slope of the top of a ratchet wheel tooth. The frame, when moved reciprocally, engages the ratchet wheel via one of the ratchet engaging arms imparting on the ratchet wheel a portion of one revolution of motion during the first half of the reciprocation. In a similar manner, a like portion of one revolution is imparted on the ratchet wheel in the same direction by the other ratchet engaging arm on the return half of the reciprocation. One of the ratchet engaging arms urges against the top of one of the ratchet wheel teeth to hold the ratchet wheel immovable between reciprocations. In the first and second embodiments, a cam is mounted with the ratchet wheel on a shaft for coaxial rotation. A cam follower connected to a slidably mounted tape head support member engages the cam to vary the elevation of the tape head support member with cam rotation. In the third embodiment, an eared wheel is mounted with the ratchet wheel on a shaft for coaxial rotation. The ears of the eared wheel act in a tapered slot formed in a tapered slot body which is rigidly connected to a slidably mounted tape head support member. As ears of the eared wheel part into the tapered slot, the tapered slot body is forced upward or downward thereby charging the elevation of the slidably mounted tape head support member. The azimuth alignment angle of the tape head in the first and third embodiments is adjustable through rotation of a single screw which acts to flex a portion of the tape head support member. In the second embodiment, azimuth angle adjustment is accomplished by pivoting a guide pin upon which the head support member is constrained to move.

3 Claims, 25 Drawing Figures

RATCHET HEAD TAPE MOVER

This is a continuation-in-part of application Ser. No. 372,871; filed June 22, 1973, now abandoned.

BACKGROUND OF THE INVENTION

1. Field of the Invention

The present invention relates to magnetic tape recorders and players and more particularly to an improved means of advancing a ratchet wheel in response to the reciprocating action of a solenoid piston and of aligning the elevation of the tape head with one of several tracks on a magnetic tape and of adjusting the azimuth alignment angle of the tape head.

2. Description of the Prior Art

Use of engaging arms in conjunction with the reciprocal motion of a solenoid piston for advancing a ratchet wheel is well known in the prior art. For example, U.S. Pat. No. 3,450,409—Pitzer discloses and discusses the theory of imparting rotary motion upon the ratchet wheel by reciprocal motion of a solenoid piston having ratchet engaging arms attached thereto. U.S. Pat. No. 3,632,114—Ban illustrates the use of two pivotally mounted engaging arms attached by a tee-bar to the piston of a solenoid for advancing a ratchet wheel as illustrated therein. U.S. Pat. No. 3,820,160—Huber discloses a frame-engaging arm arrangement connected to the end of a reciprocation piston.

The primary disadvantage of the prior art devices noted is that the engaging arms of these devices are either alternately in compression and tension or both in tension during engagement with the teeth of the ratchet wheel. The tensive action of engaging arms necessitates a "hook" at the end of each engaging arm which hook is subject to rapid wear and brings about unit failure after a relatively short life.

Also known in the art is the use of a cam mounted with a ratchet wheel on a shaft for coaxial rotation and a cam follower to effect changes in tape head support member elevation. For example, U.S. Pat. No. 3,820,180—Huber discloses an axial cam engaging a slidably mounted tape head support member. Such tape head support members are urged against the cam by a compression spring with a relatively high spring constant. The stability of the tape head support member, and consequently the tape head, in the direction of its sliding motion is dependent upon the compression spring strength. In some applications, such as automobile tape systems, the tape system is subjected to vibrations and impacts caused, for example, by bumps and other road irregularities. These vibrations and impacts cause the tape head to "bounce" against the compression spring and momentarily leave its position adjacent the recorded sound track, thus causing "voids" or "skips" in the sound emitted or recorded. If the compression spring strength is increased in an effort to minimize or eliminate "bounce," the cam follower is urged against the cam with greater force, impeding cam rotation and increasing the wear of the cam surface and the cam follower. There is no suitable means in the prior art to avoid "bounce" while at the same time minimizing the wear of the cam surface and the cam follower.

Adjustable tape head support members are also well known in the prior art as illustrated in U.S. Pat. No. 3,575,422—Peltz and U.S. Pat. No. 3,573,391—Harada. Peltz illustrates slidably mounted tape head support members constrained to move only in a vertical direction. As can be seen from Peltz, no provision is made for adjusting the azimuth angle of the tape head. In Harada, provision is made for adjusting the azimuth angle of the tape head, but the adjustment requires the balancing of at least two adjusting screws making accurate adjustment extremely difficult. U.S. Pat. No. 2,880,280—Gernert et al. discloses an adjustment system based on flexing a metal strip by a force exerted through rotation of a screw. Adjustment by the Gernert et al. apparatus, however, results in variation of the distance between the "head" and the "tape" and also, variation of the "head" elevation relative to the "tape." Thus, the prior art has failed to provide a satisfactory means of properly adjusting the azimuth angle so that the tape head sensors lie parallel to the magnetic tape without unwanted changes in tape head spacing and elevation.

SUMMARY OF THE INVENTION

In accordance with the first and second embodiments of the present invention, a ratchet advancing unit is incorporated in a magnetic tape recorder or player including a magnetic tape head which has a movable tape head support member, the elevation of which is determined by a cam, cam follower, and a ratchet wheel for rotating the cam. The cam is provided with surfaces of four distinct elevations differing in height from one another consecutively by a distance equal to the distance between adjacent tracks of an eight-track tape, customarily 0.032 inches. With each 45° rotation of the ratchet wheel and cam coaxially mounted therewith, the cam follower and its rigidly connected tape head support member are caused to change in elevation by the distance required to access the next desired tape track. In the third embodiment, the elevation of the tape head support member is determined by an eared wheel-tapered slot arrangement which eliminates tape head "bounce" by obviating the need for a compression spring in the direction of tape head support member sliding motion. The eared wheel is coaxially connected to a ratchet wheel and is composed of a laminate of discs each of a thickness approximately equal to the distance between adjacent tracks of an eight-track tape, i.e., approximately 0.032 inch. Extending radially outward from opposite edges of the circumference of each disc 180° apart are two ears. Adjacent discs of the laminate are consecutively rotated with respect to one another by 45°. A tapered slot is provided in a tapered slot body which is rigidly connected to the slidably mounted tape head support member. The tapered slot is positioned with respect to the eared wheel to receive the ears consecutively as the eared wheel is rotated. With the eared wheel positioned to engage the tapered slot of the tape head support member, as the ratchet wheel and the coaxially mounted eared wheel are rotated, a new ear engages the tapered slot with each 45° of rotation and causes the tape head support member to change in elevation a distance equal to the difference in height between the new ear and the prior ear, which corresponds approximately to the distance, or an integral multiple of the distance, between adjacent tracks of an eight-track tape. Thus, the tape head is shifted to a new track with each 45° turn of the ratchet wheel. Between reciprocations, one ear is held in the tail of the tapered slot to avoid "bounce" or other movement thereof.

The ratchet advancing unit comprises a frame having extending in opposite directions from its inner walls ratchet engaging arms for engaging in compression the teeth of the ratchet wheel. The slope of each engaging arm is approximately equal to the slope of the top surface of the ratchet wheel teeth. The ratchet advancing unit moved in a reciprocal fashion in a conventional manner driven by the piston movement of a solenoid. During the first half of the solenoid cycle, one ratchet engaging arm of the ratchet advancing unit engages and pushes a tooth of the ratchet wheel with the engaging arm in compression and imparts upon the ratchet wheel rotational motion corresponding to 1/16 of one revolution. During the return leg of the ratchet advancing unit reciprocation, the lower ratchet engaging arm engages and pushes another tooth of the ratchet wheel with the engaging arm in compression and imparts upon the wheel an additional 1/16 of one revolution. In the rest position of the ratchet advancing unit, the lower ratchet engaging arm engages and urges against the top surface of one of the teeth of the ratchet wheel thereby preventing unwanted rotational movement of the ratchet wheel between reciprocations of the solenoid.

Alternative adjusting means are provided for adjusting the azimuth angle of the tape head. The adjusting means comprises a head frame for holding the tape head which is connected to a tape head support member in such a way that the head frame can be rotated with respect to the tape head support member in response to adjustment of a single screw, thereby allowing for the alignment of the azimuth angle. In the first and third embodiments, the head frame is connected to the tape head support member by a flexible strip of metal. A single screw passes through the tape head support member and engages the head frame such that rotation of the screw forces the connecting metal strip to flex causing the head frame to rotate with respect to the tape head support member thereby altering the azimuth angle.

The azimuth adjusting means of the second embodiment comprises a pivotably mounted pin on which the tape head support member is constrained to slide. A single screw adjustment causes the pin to pivot thereby altering the azimuth angle of the tape head support member and the tape head supported thereby.

Thus, it is a primary object of the present invention to provide a tape head adjusting system having an improved means of advancing a ratchet wheel.

A further object of the present invention is to provide a tape head adjusting system incorporating an inexpensive ratchet advancing unit having oppositely directed ratchet wheel engaging arms for engaging in compression the teeth of the ratchet wheel.

Another object of the present invention is to provide a tape head adjusting system for adjusting the tape head elevation in response to rotation of a ratchet wheel.

It is still another object of the present invention to provide a tape head adjusting system which eliminates tape head "bounce" heretofore occasioned by vibrations and impacts of the tape system.

Still another object of the present invention is to provide a tape head adjusting system having a means for adjusting the azimuth angle of the tape head.

These and other objects of the present invention will be apparent from the following descriptions and disclosures.

DESCRIPTION OF THE PREFERRED EMBODIMENT

Figure 1:
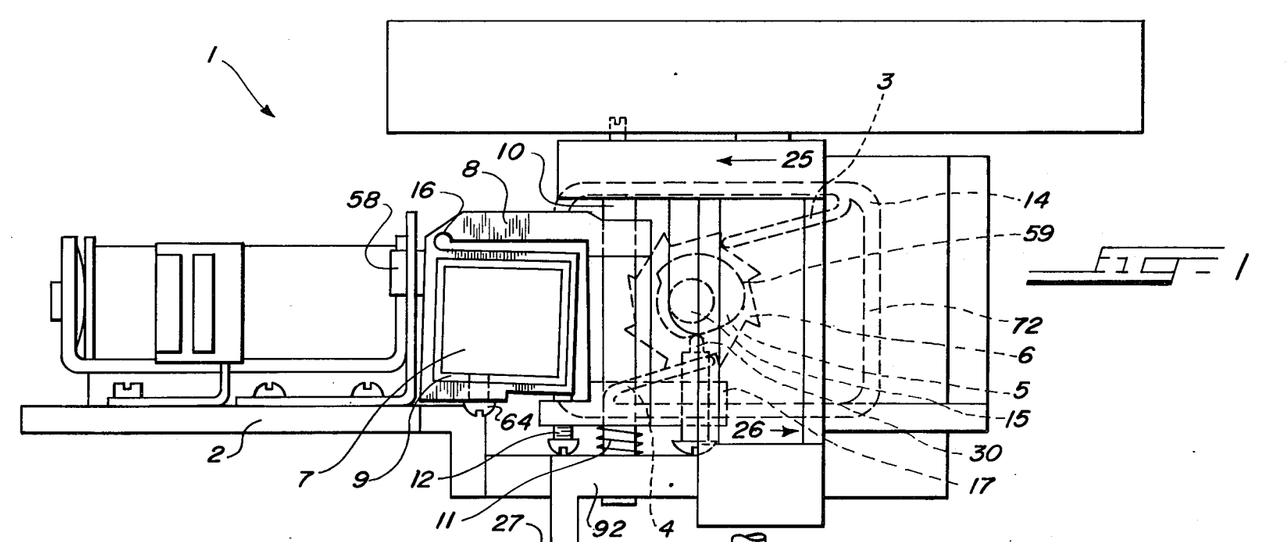
FIG. 1 is a front elevation view of a preferred embodiment of the present invention.
Figure 2:
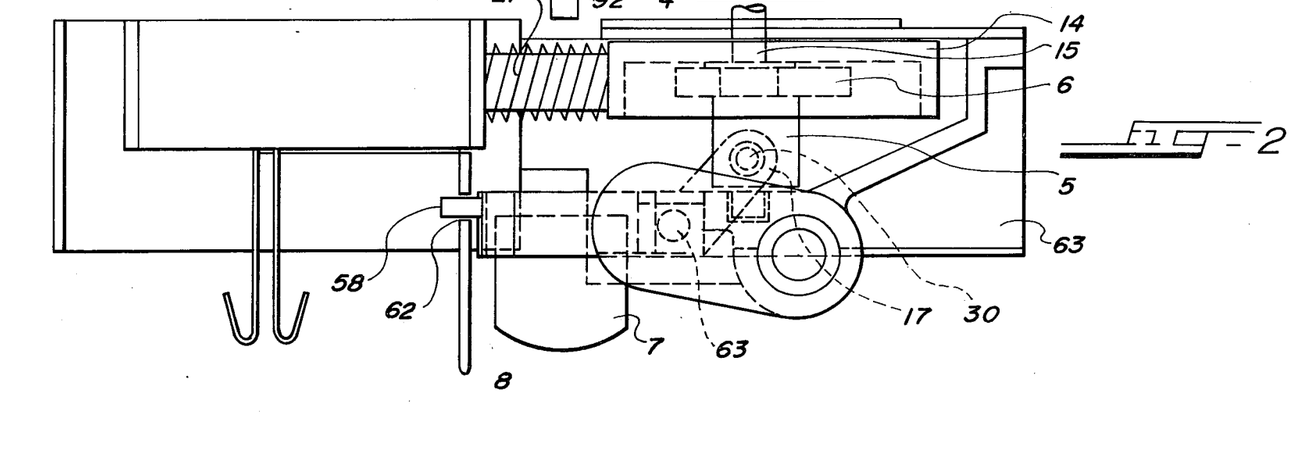
FIG. 2 is a top view of the embodiment illustrated in FIG. 1.

With reference to FIGS. 1 and 2 in the first embodiment, a magnetic tape head unit 1 has a tape head support member 8 which is slidably mounted on pin 10 and continually urged toward its uppermost position by compression spring 11. The tape head support member 8 is moved from its upper most position downward in stages by means of interaction between cam follower 30 and rotating cylindrical cam 5, the latter having an irregular contoured outer surface 59 with four distant surfaces which differ in height consecutively from one another by a distance equal to the distance (customarily 0.032 inch), or an integral multiple of the distance, between adjacent tracks of an eight-track tape. Cam follower 30 shown in FIG. 1 is rigidly mounted to tape head support member 8 by means of arm 17 (more clearly shown in FIGS. 4 and 6). As cam 5 is rotated, cam follower 30 follows the countoured surface 59 of can 5 forcing tape head support member 8 to slide vertically along pin 10 thereby driving the elevation of tape head 7 to one of four points vertically to correspond with tracks on the magnetic tape (not shown) passing over tape head 7.

Ratchet wheel 6 is coaxially mounted with cam 5, and accordingly, both cam 5 and ratchet wheel 6 rotate with shaft 15. Rotation of ratchet wheel 6 is effected by reciprocal movement of ratchet advancing unit 14 in response to the conventional reciprocation of solenoid piston 27. As can be seen more clearly from FIG. 9, motion in the direction of arrow 25 urges ratchet engaging arm 3 to engage in compression ratchet wheel tooth 28 causing rotation of ratchet wheel 6 in a counterclockwise direction through approximately 1/16 revolution. During the second half of the reciprocal motion of solenoid piston 27 (shown in FIG. 2) ratchet advancing unit 14 is forced in the direction of arrow 26 in FIG. 9 causing ratchet engaging arm 4 to engage in compression ratchet wheel tooth 29 (which is moved into position to engage arm 4 during the first half cycle) imparting an additional 1/16 counterclockwise turn on ratchet wheel 6. One complete reciprocation of ratchet advancing unit 14 thereby imparts on ratchet wheel 6, and cam 5 approximately ⅛ rotation or 45°. It will be noted that problems stemming from wear of engaging-arm hooking arrangements common in prior art are avoided by the "pushing" action of engaging arms 3 and 4 whereby each arm is in compression during its active ½ cycle of solenoid piston 27 reciprocation. Thus, relatively blunt ends resulting from extreme wear on engaging arms 3 and 4 will not cause malfunction and, consequently, the present invention has a greatly extended operational life in comparison to known ratchet advancing means of the prior art.

Figure 9:
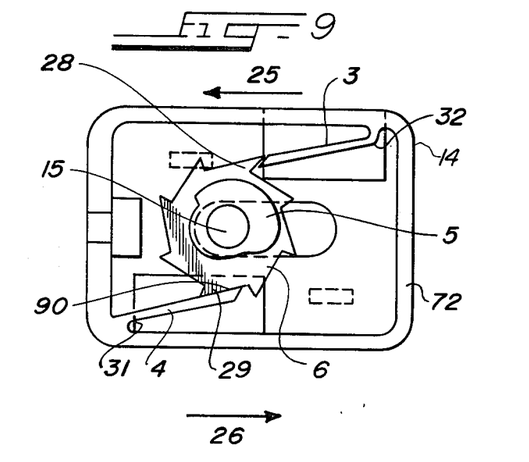
FIG. 9 is a front elevation view of the ratchet advancing unit of the present invention.
Figure 10:
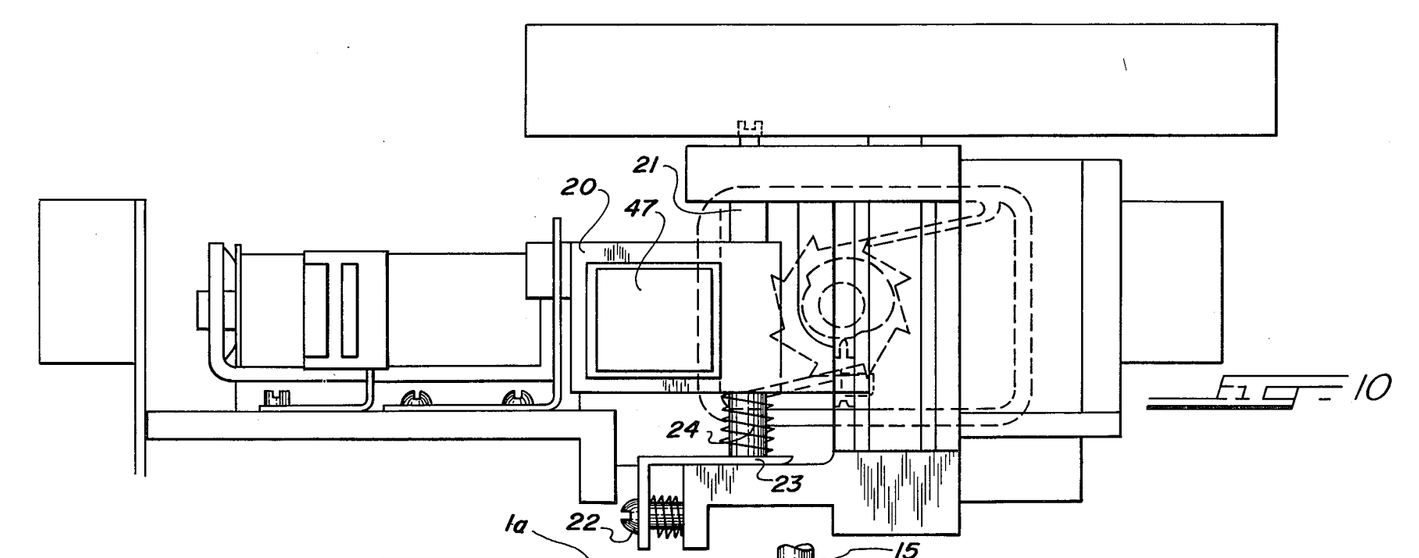
FIG. 10 is a front elevation view of the composite structure of the second alternative embodiment of the present invention.
Figure 11:
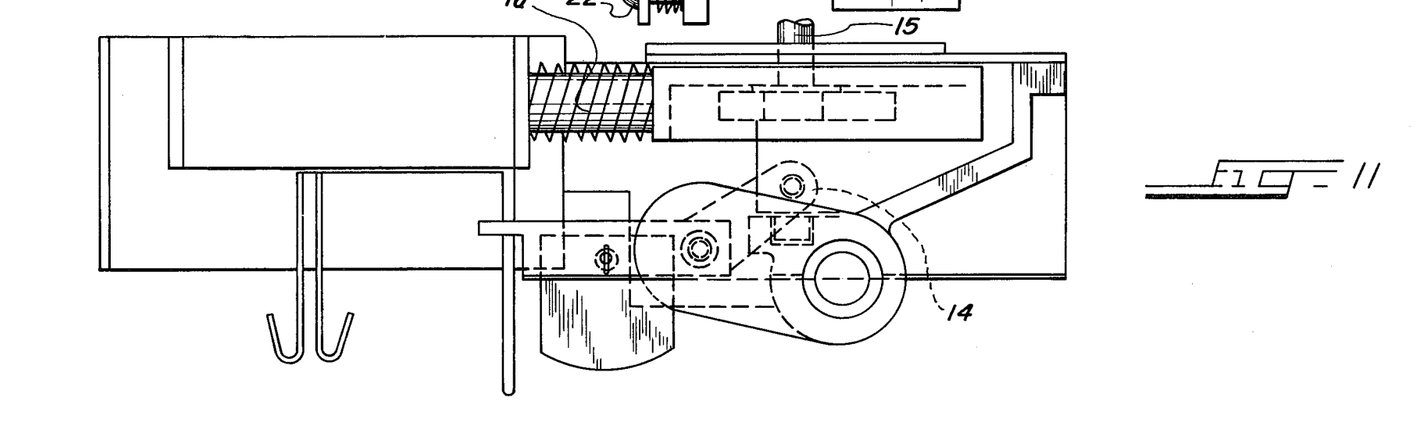
FIG. 11 is a top view of the composite structure illustrated in FIG. 10.

As can be seen in FIG. 9, unwanted rotation between reciprocations of the solenoid piston 27 is prevented by ratchet engaging arm 4 which exerts an upward force against the top flat surface 90 of ratchet wheel toof 29, thereby holding ratchet wheel 6 in a stationary position. Ratchet advancing unit 14 is construed of a flexible plastic material which allows ratchet engaging arm 4 to flex at point 31 shown in FIG. 9 as it encounters tooth 29 during the first half of the reciprocation and, similarly, allows ratchet engaging arm 3 to flex at point 32 during the second half of such motion.

Figures 3, 4:
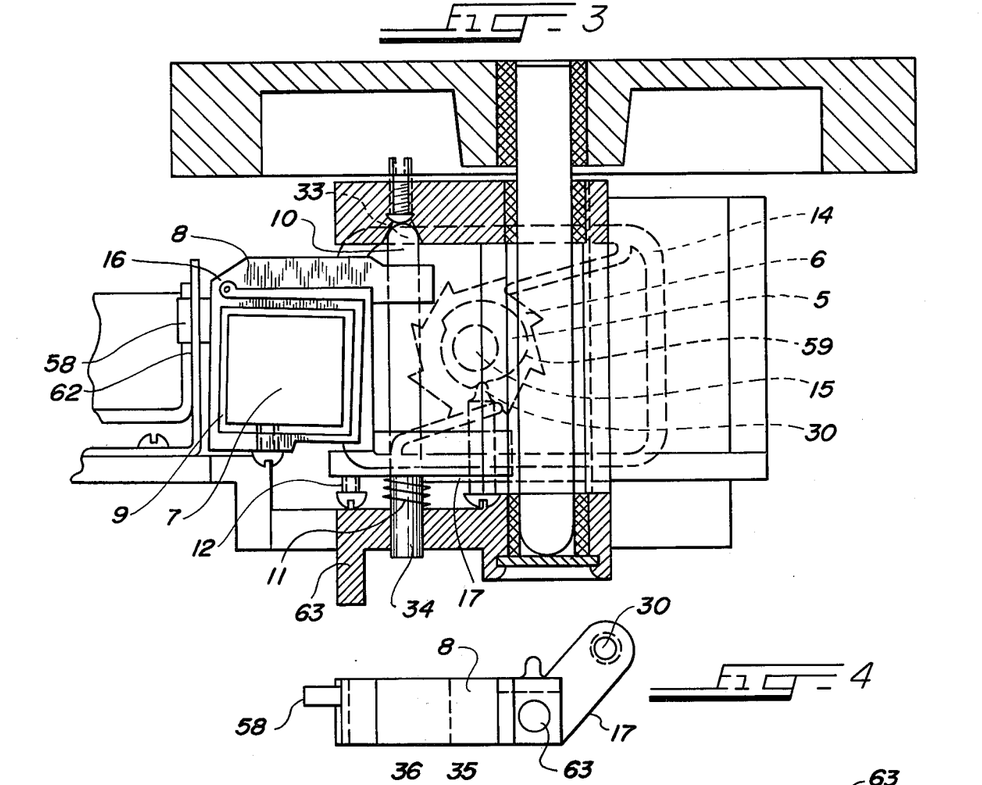
FIG. 3 is a cross-sectional partially fragmentary view of the embodiment illustrated in FIG. 1.
FIG. 4 is the top view of the tape head support member of the embodiment illustrated in FIG. 1.
Figure 5:
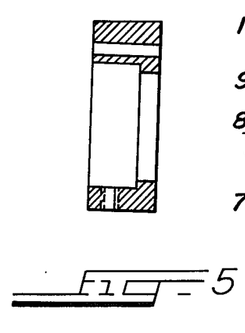
FIG. 5 is a cross-sectional view taken along line 5—5 in FIG. 6.
Figure 6:
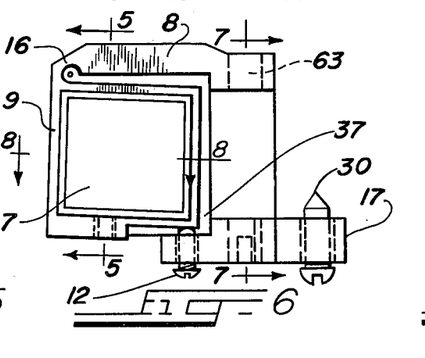
FIG. 6 is a front elevation view of the head support member illustrated in FIG. 4.
Figure 7:
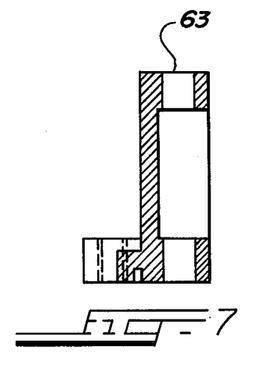
FIG. 7 is a cross-sectional view taken along line 7—7 in FIG. 6.
Figure 8:
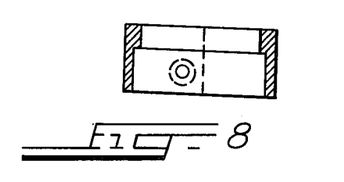
FIG. 8 is a cross-sectional view taken along line 8—8 in FIG. 6.

Referring to FIGS. 3, 4, and 6, head frame 9 is flexibly mounted to the tape head support member 8 at point 16. Arm 17 rigidly holds cam follower 30, and is integrally molded to tape head support member 8. Tape head support member 8 also holds azimuth adjustment screw 12 and defines a guide pin race 63. The tape head support member 8 is slidably mounted on guide pin 10, the lower end 34 of which fits within guide pin race 63. Guide pin 10 (see FIG. 3) is rigidly mounted at its upper end 33 and at its lower end 34 in the tape player frame 92. The head support member 8 is thus constrained to move in a vertical path along guide pin 10, rotation about guide pin 10 being prevented by ear 58 (shown in FIG. 2) acting in guide slot 62. As seen in FIG. 1, tape head 7 is firmly held in head frame 9 by screw 64 and as coaxially mounted cam 5 and ratchet wheel 6 are rotated, tape head support member 8, connected to cam 5 through arm 17 and cam follower 30, is caused to change in elevation to correspond to one of four tape track channels.

The foregoing illustration and disclosure of the cam and cam follower operation applies as well to the second embodiment. The foregoing illustration and disclosure of the ratchet advancing means operation applied as well to the second and third embodiments.

The azimuth angle of tape head 7 is the angular separation between the line 36 representing a line perpendicular to the tracks on the magnetic tape, and tape head symmetry line 45 which is perpendicular to the gaps (not shown) on the tape head 7. When the head frame azimuth angle is adjusted to zero, the tape head gaps will be parallel to the tracks on the magnetic tape in the appropriate position for use.

Adjustment of the azimuth angle is accomplished in the first embodiment by rotation of screw 12 shown in FIGS. 1, 3, and 6 which cause flexibly mounted head frame 9 to flex or bend at point 16 thereby tilting the tape head. Prior to adjustment of the azimuth angle, the tape head symmetry line 35 of tape head 7 differs from magnetic tape perpendicular 36 by an alignment error angle. As shown in FIG. 6, if screw 12 is turned in a clockwise direction a force is exerted at point 37 on flexibly mounted head frame 9 causing said frame to tilt about an imaginary axis at point 16. This rotation about an imaginary axis at point 16 causes the tape head symmetry line 35 to move in the direction of magnetic tape perpendicular line 36 thereby diminishing the alignment error angle. The azimuth angle of tape head 7 is properly adjusted when line 35 is superimposed over line 36 and the alignment error angle equals zero.

Figure 12:
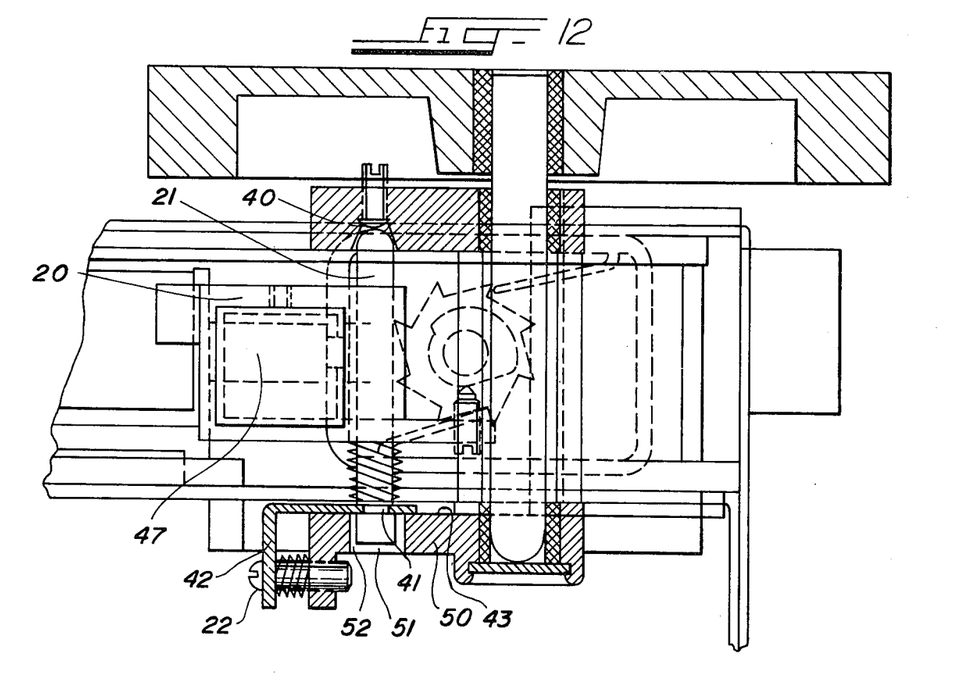
FIG. 12 is a cross-sectional view taken along line 12—12 in FIG. 10.

With reference to FIG. 12, in the second embodiment, an alternative means for adjusting the azimuth angle is illustrated. In this embodiment, pin 21, on which tape head support member 20 is constrained to move in the vertical direction is slidably mounted to tape player base 50 by means of bracket 42. Bracket 42 is slidably mounted to base 50 to allow for slippage along surface 43 in response to adjustment of screw 22. Pin 21 is allowed to pivot about point 40 as its lower mounting point 41 is moved in a horizontal direction in response to rotation of screw 22. The base 50 has been machined at point 51 to allow for a space 52 on each side of pin 21, thereby providing clearance for the movement of the lower end 41 of pin 21. Adjustment of screw 22 in either the clockwise or counterclockwise direction causes pin 21 to pivot about point 40, thus tilting tape head support member 20 and, correspondingly, tilting tape head 47 to align tape head 47 with the tracks on the magnetic tape.

Proper adjustment of the azimuth angle is affected by rotating screw 22 either clockwise or counterclockwise until the tape head symmetry line corresponds with the magnetic tape perpendicular line in a manner analogous to the alignment described with reference to FIG. 6 for the first embodiment except that in this second embodiment, the tape head 47 is effectively tilted about an imaginary axis at point 40.

Figure 13:
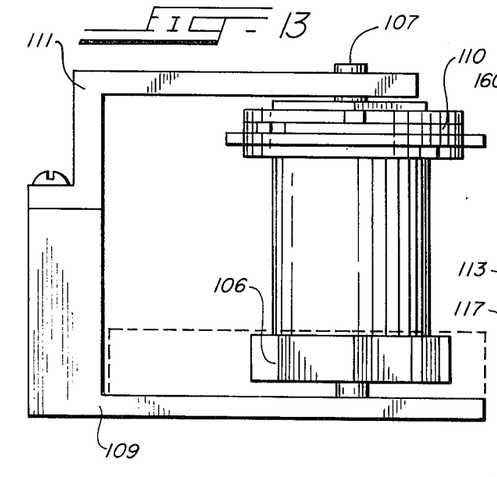
FIG. 13 is a front elevation view of the coaxially mounted ratchet wheel and eared wheel arrangements of the third embodiment supported by a base frame arrangement.
Figure 14:
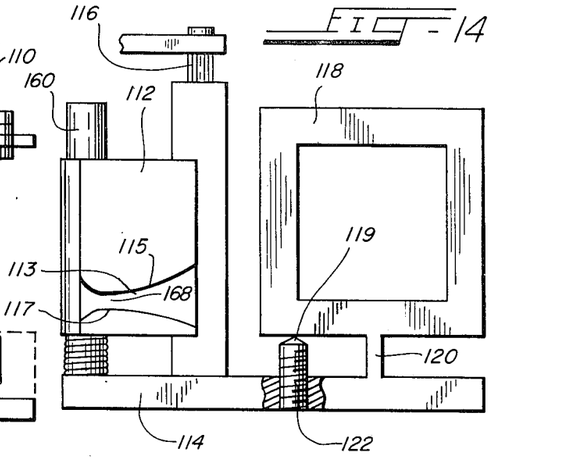
FIG. 14 is a front elevation view of the tape head support member and tapered slot arrangement of the third embodiment.
Figures 15, 16, 25:
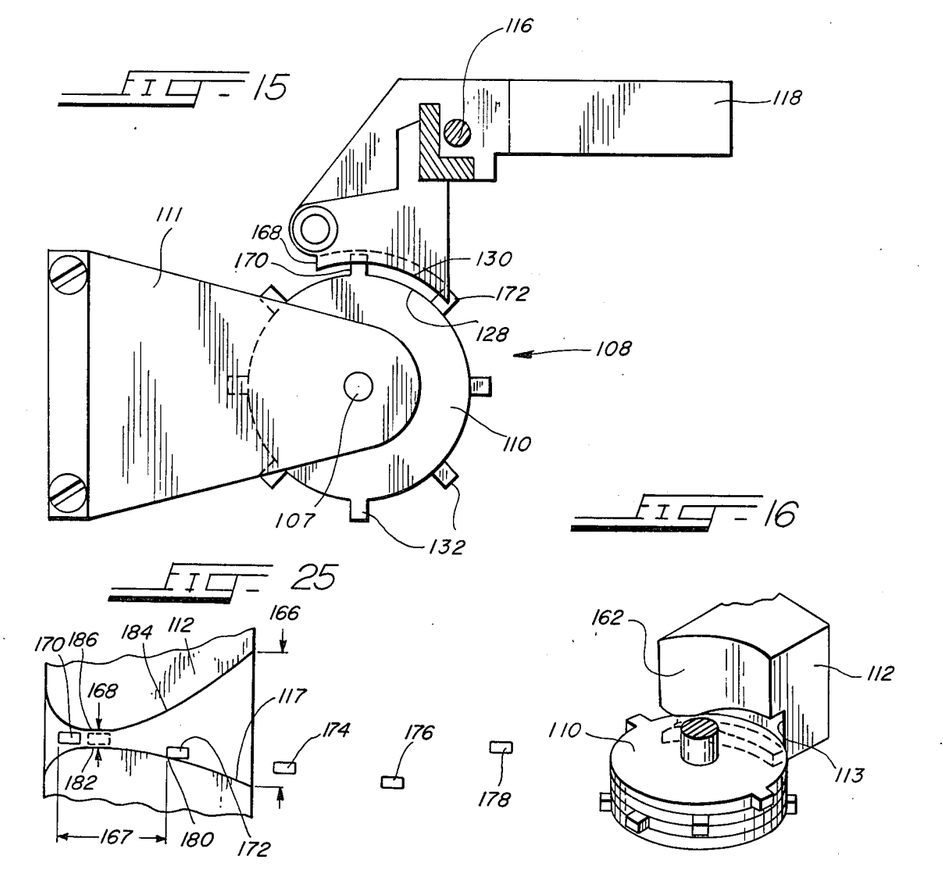
FIG. 15 is a top view of the arrangements of FIGS. 13 and 14 in operable engagement.
FIG. 16 is a pictorial view of the eared wheel and tapered slot arrangements of the third embodiment in operable engagement.
FIG. 25 is a schematic illustration of the tapered slot and eared wheel ears interacting.
Figure 17:
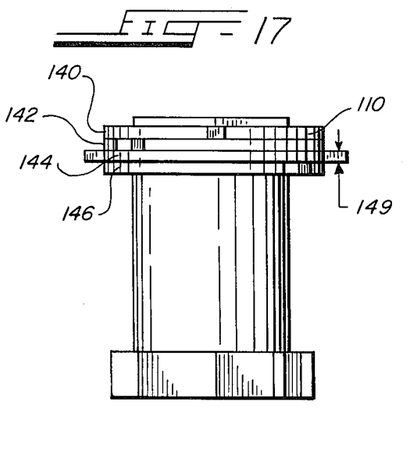
FIG. 17 is a front elevation view of the coaxially mounted ratchet wheel and eared wheel arrangements of the third embodiment.
Figure 18:
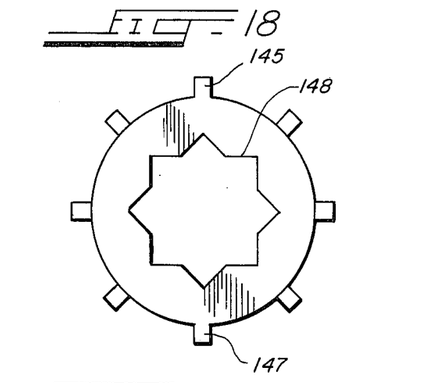
FIG. 18 is a top view of the eared wheel arrangement of the third embodiment.
Figure 19:
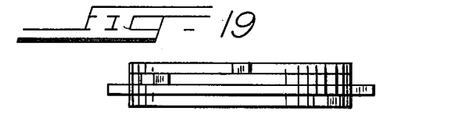
FIG. 19 is a front elevation view of the eared wheel arrangement shown in FIG. 18.
Figure 20:
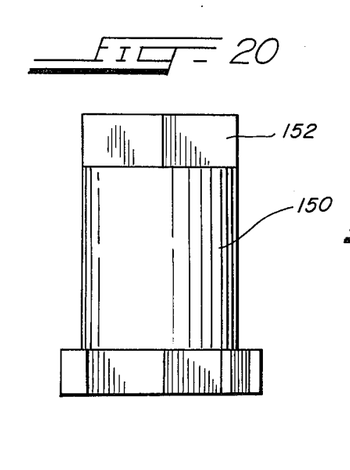
FIG. 20 is a front elevation view of the FIG. 17 arrangement with the eared wheel removed.
Figure 21:
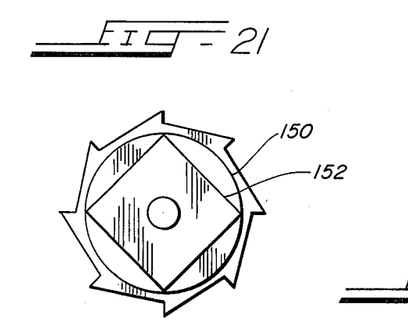
FIG. 21 is a top view of the FIG. 20 arrangement.
Figure 22:
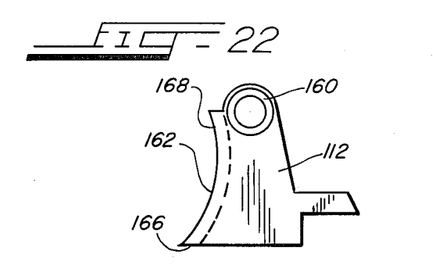
FIG. 22 is a top view of the tapered slot arrangement shown removed from the tape head support member.
Figure 23:
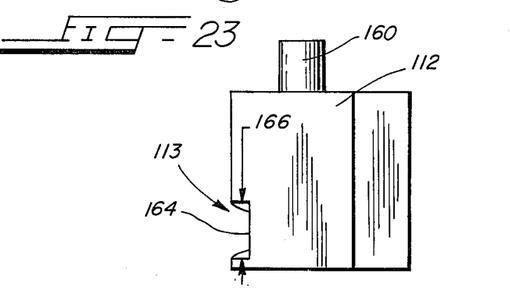
FIG. 23 is a front elevation view of the tapered slot arrangement of FIG. 22.
Figure 24:
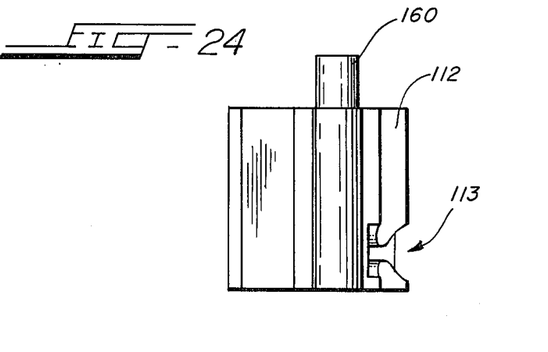
FIG. 24 is a rear elevation view of the tapered slot arrangement of FIG. 22.

With reference generally to FIGS. 13 through 25 and in particular to FIGS. 13 through 15, the eared wheel-tapered slot arrangement 108 of the third embodiment comprises ratchet wheel 106 coaxially mounted for rotation on axle 107 with eared wheel 110. Axle 107 is rotatably mounted in and supported by axle support 109 and upper support arm 111 such that advancement of ratchet wheel 106, in the manner described with reference to the first embodiment, results in counterclockwise rotation of eared wheel 110. Eared wheel-tapered slot arrangement 108 further comprises tapered slot body 112 which is rigidly connected to tape head support member 114 and which is slidably connected to the tape system support frame (not shown) through vertical pin 116. Head frame 118 is flexibly connected to tape head support member 114 by means of flexible strip 120, an arrangement which, with the action of screw 122, permits adjustment of the azimuth angle in the manner later described in more detail.

With tapered slot body 112 rigidly connected to slidably mounted tape head support member 114, forces exerted on tapered slot body 112 in the direction of sliding motion of tape head support member 114 cause head frame 118 and the tape head (now shown) mounted therein to slide along vertical pin 116.

Referring to FIGS. 15 and 16, upper support arm 111 and axle support 109 (not visible in FIG. 15) are positioned on the tape system support frame (not shown) in close relation to vertical pin 116 such that the circumference 128 of eared wheel 110 corresponds to the contour surface 130 of tapered slot body 112 thereby enabling ears 132 of eared wheel 110 to act within tapered slot 113. As eared wheel 110 is rotated, ears 132 enter tapered slot 113 consecutively and exert either an upward or downward force respectively on slot roof 115 or slot floor 117 thereby driving tape head support member 114 vertically along vertical pin 116 to a new elevation.

Referring to FIGS. 17 through 21, eared wheel 110 comprises a laminate of discs 140, 142, 144, and 146 each of which is provided with two circumferential ears 145 and 147 extending radially outward and separated by 180°. The thickness 149 of each disc corresponds to the distance between adjacent tracks of the tape to be used in the system, customarily 0.032 inch, and the center of each disc defines a hole 148 characterized by eight points and by a periphery defined as shown by the pattern of two equal-sized squares rotated with respect to one another by 45°.Referring to FIGS. 20 and 21, a drum 150 rigidly connected to ratchet wheel 106 is provided with a top portion 152 having a square cross section corresponding to the square size defined by hold 148. The operational embodiment of eared wheel 110 is formed by placing discs 146, 144, 142, and 140 on the squared top portion 152 of drum 150 such that the ears 145 and 147 of each consecutive disc are rotated 45° counterclockwise from the ears 145 and 147 of the preceding disc, giving rise to the eared wheel arrangement illustrated in FIG. 18.

With reference to FIGS. 22 through 25, tapered slot body 112 is rigidly connected to tape head support member 114 by means of rod 160. As previously stated, the contour 162 of tapered slot body 112 substantially corresponds to the circumference of eared wheel 110. The face 164 of tapered slot 113 is formed with a radius slightly greater than the radius of eared wheel 110 plus the length of one of ears 145 or 147. Slot mouth 166 is of a height exceeding the thickness of the laminate of discs 140, 142, 144, and 146 making up eared wheel 110, and slot tail 168 is of a height which substantially corresponds to the thickness of one of the discs of eared wheel 110.

Referring again to FIGS. 15 and 16 and to FIGS. 25, as eared wheel 110 is rotated ⅛ of one revolution by the advancement of ratchet wheel 106 in the course of a single reciprocation of solenoid piston 27 (see FIG. 2), the next ear 172 (ear 145 of disc 142) which trails lead ear 170 by 45° (the distance 167 in FIG. 25) engages slot floor 117 and urges tapered slot body 112 downward a distance equal to disc 142 thickness while proceeding to slot tail 168. Next ear 172 stops as it reaches position 173 (dashed line in FIG. 25) in slot tail 168 in wait of the next reciprocation of solenoid piston 27.

The height of slot tail 168, as previously noted, is substantially equal to the thickness of the ears 132 of eared wheel 110. Accordingly, with the rotation of eared wheel 110 such that next ear 172 is stationary in slot tail 168, vertical movement of tape head support member 114, including "bounce" caused by vibrations and impacts, is prevented.

As eared wheel 110 is further rotated by successive reciprocations of solenoid piston 27, ear 174 (ear 145 of disc 144) and ear 176 (ear 145 of disc 146) respectively, of eared wheel 110 engage slot 113 and, in the manner just described, cause elevation changes of tape head support member 114. As eared wheel 110 is rotated 180°, the elevation of tape head support member 114 is returned to its starting position by the action of ear 178 (ear 147 of disc 140) in slot tail 168. Thereafter, the sequence is repeated enabling tape track selection and adjustment of the elevation of the tape head support member with rotation of eared wheel 110.

With particular reference to FIG. 25, tapered slot 113 of the preferred third embodiment is designed so that as the trailing edge of the lead ear 170 passes from slot tail 168, the leading edge of the next ear 172 just engages the slot floor 117. To this end, the slot floor 117 is contoured so that point 180 lies the thickness of one disc (preparably 0.032 inch) below the lower flat surface 182 of slot tail 168. Ample space is provided beyond slot tail 168 for the vertical excursion of lead ear 170 as it clears tapered slot body 112. With the slot floor 117 contoured as described, the sequential engagement of ears 174 and 176 is easily accommodated. With further reference to FIG. 25, to facilitate the return to starting elevation occasioned by the action of ear 178 (ear 147 of disc 140), the slot roof 115 is contoured such that point 184 (directly above point 180) is approximately three times the thickness of one disc (preferably 0.096 inch) above the upper flat surface 186 of slot tail 168 so that as the trailing edge of next ear 176 clears the slot tail 168, the lead edge of ear 178 engages slot roof 115. Thus, as a result of the contouring and shape of the tail, roof, floor and mouth of tapered slot 113, the ears 132 of eared wheel 110 sequentially entering tapered slot 113 act to control the elevation of tape head support member 114.

Of course, eared wheel 110 could have been formed by discs sequentially rotated 45° clockwise with respect to one another in which case successive ears such as those illustrated in FIG. 25 would ascend with each "next ear" lying above the previous ear and engaging in sequence slot roof 115. The foregoing also results from reversing the direction of rotation of eared wheel 110. For the above arrangements, the contouring for slot roof 115 and slot floor 117 is reversed.

Initial gross vertical alignment of the uppermost tape track with the elevation of ear 145 of disc 140 is achieved by altering the position of tapered slot body 112 along rod 160 after which the rigid engagement (by any conventional means such as a set screw, or adjustment screw between rod 160 and tapered slot body 112) is restored.

With reference to FIG. 14, the azimuth adjustment means of the third embodiment comprises flexible strip 120 connecting tape head support member 114 and head frame 148. And further comprises adjustment screw 132 which is supported by tape head support member 114 by means of threads as it passes through horizontal member 123 to engage head frame 128 at point 119.

Tape head support member 114 and head frame 118 connected thereto are cast or formed with head frame 118 tilted to the left, as shown, by 2° to 5°. After assembly, the azimuth angle is simply aligned by clockwise rotation of adjusting screw 122 which causes head frame 118 to tilt closkwise thereby eliminating any azimuth angle error.

The azimuth adjusting means of the third embodiment (FIG. 14) differs from and is superior to that of the first embodiment (FIG. 6), and adjusting means generally of the prior art, because the vertical elevation of the tape head is not significantly changed with azimuth adjustments. It will be noted that azimuth adjustment by means other than that illustrated in FIG. 14 and described above gives rise to unwanted changes in tape head elevation and requires difficult compensating adjustments.

Various changes, modifications, and variations could be made in the arrangements, operation and details of construction of the elements disclosed herein without departing from the spirit and scope of the present invention as defined in the appended claims wherein I claim:

1. In a magnetic tape system including a magnetic tape head with tape gaps for accessing a magnetic tape having a plurality of tape tracks, a movable tape head support member mounted for movement to be aligned in relation to each of said plurality of tape tracks, plurality of tape tracks, a tape head elevation adjustment arrangement comprising:

wheel means, said wheel means supported for rotation adjacent said tape head support member; said wheel means having a plurality of radially projecting extensions, said radially projecting extensions separated consecutively by an integral multiple of the distance between adjacent tape tracks;

slot means, said slot means rigidly connected to said tape head support member, said slot means defining a slot for receiving said radially projecting extensions of said wheel means and assuming an elevation corresponding to the elevation of the radially projecting extension received.

2. A tape head elevation adjustment arrangement for a magnetic tape system as claimed in claim 1 wherein said wheel means comprises a laminate of discs each defining a central hole for receiving a rotationally driven member and each having a plurality of ears extending radially outward from its periphery, each of said discs having a thickness corresponding to an integral multiple of the distance between adjoining tape tracks.

3. A tape head elevation adjustment arrangement for a magnetic tape system as claimed in claim 1 wherein said slot means comprises a body defining a tapered slot having a mouth section and a tail section; said mouth section having an opening at least equal to the height of said wheel means for receiving said plurality of ears, said tail section having an opening substantially equal to the height of at least one of said plurality of ears for receiving and engaging at least one of said plurality of ears, said tapered slot having a contour defining a slot roof and a slot floor, said slot roof spaced above said tail section, said slot floor spaced below said tail section.

* * * * *